United States Patent
Odaka (10) Patent No.: US 10,343,511 B2
(45) Date of Patent: Jul. 9, 2019

(54) VEHICLE IN-WHEEL MOTOR DRIVE DEVICE

(71) Applicant: TOYOTA JIDOSHA KABUSHIKI KAISHA, Toyota-shi, Aichi (JP)

(72) Inventor: Kenji Odaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/176,291

(22) Filed: Oct. 31, 2018

(65) Prior Publication Data
US 2019/0126740 A1    May 2, 2019

(30) Foreign Application Priority Data

Oct. 31, 2017   (JP) .................................. 2017-211280

(51) Int. Cl.
   *B60K 7/00*   (2006.01)
   *B60K 17/14*   (2006.01)
(52) U.S. Cl.
   CPC .......... *B60K 7/0007* (2013.01); *B60K 17/145* (2013.01); *B60K 2007/0061* (2013.01)

(58) Field of Classification Search
   CPC .................................................... B60K 7/0007
   See application file for complete search history.

(56) References Cited

U.S. PATENT DOCUMENTS

2002/0000135 A1*    1/2002    Zaps ........................ F16D 7/04
                                                             74/411

FOREIGN PATENT DOCUMENTS

JP          2016-222164 A         12/2016

* cited by examiner

*Primary Examiner* — James A Shriver, II
*Assistant Examiner* — James J Triggs
(74) *Attorney, Agent, or Firm* — Oliff PLC

(57) ABSTRACT

In a vehicle in-wheel motor drive device, an in-wheel motor unit is supported by a supporting member in a posture in which a direction from a first axis to a center-of-gravity position of the in-wheel motor unit has a horizontal direction component in an axially perpendicular plane perpendicular to the first axis, and the supporting member is provided with a stopper brought into contact with the in-wheel motor unit to regulate vibrations having a component in a vertical direction around the first axis of the in-wheel motor unit before an elastic member reaches an elastic limit.

6 Claims, 6 Drawing Sheets

VEHICLE IN-WHEEL MOTOR DRIVE DEVICE

This application claims priority from Japanese Patent Application No. 2017-211280 filed on Oct. 31, 2017, the disclosure of which is herein incorporated by reference in its entirety.

BACKGROUND OF THE INVENTION

Field of the Invention

The present invention relates to an improvement of a vehicle in-wheel motor drive device rotationally driving a wheel by an electric motor disposed inside the wheel.

Description of the Related Art

There is known an in-wheel motor drive device comprising (a) an in-wheel motor unit having an output shaft arranged on a substantially horizontal first axis that is a center of rotation of a wheel, an electric motor arranged on a second axis parallel to the first axis and offset from the first axis, a transmission changing a speed of rotation of the electric motor and transmitting to the output shaft, and a holding case holding the output shaft, the electric motor, and the transmission, (b) a supporting member supporting the output shaft projecting from the holding case rotatably around the first axis so that the supporting member supports the in-wheel motor unit via the output shaft rotatably around the first axis, and (c) an elastic member disposed between the holding case and the supporting member at a coupling position defined apart from the first axis and preventing the in-wheel motor unit from rotating around the first axis by elastic deformation. A device described in Patent Document 1 is an example thereof and has the first axis (an axis C) of a wheel hub) and the second axis (an axis P of a motor) offset from each other and the holding case (a speed reduction portion casing 27) elastically coupled at three coupling positions (coupling tools 41) via the elastic member (a rubber bush 45) to the supporting member (a coupling portion 16) so that vibrations of the in-wheel motor unit due to a motor torque variation etc. are absorbed by the elastic member to improve NV [Noise, Vibration] performance in the vehicle interior.

CITATION LIST

Patent Document 1: Japanese Unexamined Patent Publication No. 2016-222164

SUMMARY OF THE INVENTION

Technical Problem

In such a vehicle in-wheel motor drive device, a force pivoting the in-wheel motor unit around the first axis is generated by a reaction force of a drive torque from the electric motor, and the elastic member is elastically deformed. As the drive torque increases, the reaction force becomes larger, and an elastic deformation amount of the elastic member also increases. On the other hand, if the center-of-gravity position of the in-wheel motor unit is deviated from the first axis in a horizontal direction in an axially perpendicular plane perpendicular to the first axis, and the wheel vertically vibrates due to running on a rough road etc., the center-of-gravity position of the in-wheel motor unit also vertically vibrates and the in-wheel motor unit is swung and displaced around the first axis, so that the elastic deformation amount of the elastic member further increases. In such a case, when the elastic member reaches the elastic limit, a large load due to the reaction force of the drive torque and the vibration at the center-of-gravity position is applied to a bearing portion of the output shaft on the first axis and a peripheral portion thereof, so that strength, i.e., durability, may be reduced in the bearing portion etc.

The present invention was conceived in view of the situations and it is therefore an object of the present invention to prevent reduction in durability of a bearing portion etc. of an output shaft as the elastic member reaches an elastic; limit due to vertical vibration etc. of the in-wheel motor unit.

Solution to Problem

To achieve the above object, a first aspect of the present invention provides a vehicle in-wheel motor drive device comprising: (a) an in-wheel motor unit having an output shaft arranged on a substantially horizontal first axis that is a center of rotation of a wheel, an electric motor arranged on a second axis parallel to the first axis and offset (spaced apart) from the first axis, a transmission changing a speed of rotation of the electric motor and transmitting to the output shaft, and a holding case holding the output shaft, the electric motor, and the transmission; (h) a supporting member supporting the output shaft projecting from the holding case rotatably around the first axis so that the supporting member supports the in-wheel motor unit via the output shaft rotatably around the first axis; and (c) an elastic member disposed between the holding case and the supporting member at a coupling position defined apart from the first axis and preventing the in-wheel motor unit from rotating around the first axis by elastic deformation, wherein (d) the in-wheel motor unit is supported by the supporting member in a posture in which a direction from the first axis to a center-of-gravity position of the in-wheel motor unit has a horizontal direction component in an axially perpendicular plane perpendicular to the first axis, and wherein (e) the supporting member is provided with a stopper brought into contact with the in-wheel motor unit to regulate vibrations having a component in a vertical direction around the first axis of the in-wheel motor unit before the elastic member reaches an elastic limit.

A second aspect of the present invention provides the vehicle in-wheel motor drive device recited in the first aspect of the invention, wherein the stopper is disposed such that a perpendicular line is included within a contact range of the stopper to regulate a displacement in a direction of the perpendicular line, wherein the perpendicular line passes through the center-of-gravity position and is perpendicular to a straight line connecting the center-of-gravity position of the in-wheel motor unit and the first axis in the axially perpendicular plane.

A third aspect of the present invention provides the vehicle in-wheel motor drive device recited in the first aspect of the invention, wherein (a) the center-of-gravity position of the in-wheel motor unit is located within a range of ±20 (i.e. within a range from −20° to +20°) from the horizontal direction about the first axis in the axially perpendicular plane, and wherein (b) the stopper is disposed such that at least one of positions right below and right above the center-of-gravity position is included in a contact range of the stopper in the axially perpendicular plane.

When the center-of-gravity position of the in-Wheel motor unit is in the substantially horizontal direction (within an inclination range of about ±5°) from the first axis in the axially perpendicular plane, the perpendicular line direction in the second aspect of the invention is the substantially vertical direction, and therefore, the third aspect of the invention can be regarded as an embodiment of the second aspect of the invention.

A fourth aspect of the present invention provides the vehicle in-wheel motor drive device recited in any one of the first to third aspects of the invention, wherein (a) the coupling position is defined at one position, and Wherein (b) the second axis and the coupling position are located within a range of ±20° from the horizontal direction about the first axis, and the second axis is closer to the first axis than the coupling position in the axially perpendicular plane.

A fifth aspect of the present invention provides the vehicle in-wheel motor drive device recited in any one of the first to fourth aspects of the invention, wherein the stopper is disposed such that at least one of positions right below and right above the center-of-gravity position of the in-wheel motor unit is included in the contact range of the stopper in the axial direction of the first axis.

A sixth aspect of the present invention provides the vehicle in-wheel motor drive device recited in any one of the first to fifth aspects of the invention, wherein the stopper is disposed to regulate a displacement in a pivoting direction due to a reaction force of a drive torque during forward running out of vibrations having a component in the vertical direction around the first axis of the in-wheel motor unit.

Advantageous Effects of Invention

In such a vehicle in-wheel motor drive device, since the center-of-gravity position of the in-wheel motor unit is in the direction having the horizontal direction component around the first axis in the plane perpendicular to the first axis, the center-of-gravity position of the in-wheel motor unit is vertically vibrated due to vertical vibration of the wheel, and the in-wheel motor unit is swung and displaced around the first axis while the elastic member elastically deforms. In this case, since the stopper regulates the vibration having the component in the vertical direction of the in-wheel motor unit before the elastic member reaches the elastic limit, the large load due to the reaction force of the drive torque and the vibration of the center-of-gravity position is prevented from being applied to the bearing portion of the output shaft supporting the in-wheel motor unit and a peripheral portion thereof, so that a decrease in durability of the bearing portion etc. can be prevented.

Since the elastic deformation of the elastic member at the coupling position is allowed until the in-wheel motor unit abuts on the stopper, minute vibrations of the in-wheel motor unit due to motor torque variations, meshing vibrations of the gears are absorbed by the elastic member, so that the NV performance in the vehicle interior can properly be ensured. Particularly, since the stopper prevents excessive elastic deformation of the elastic member, the elastic member which has a low elasticity, i.e., a high softness can be employed, so that the minute vibrations can properly be absorbed.

In the vehicle in-wheel motor drive device recited in the second aspect of the invention, the stopper is disposed such that the perpendicular line is included within the contact range of the stopper to regulate the displacement in the perpendicular line direction, the perpendicular line passes through the center-of-gravity position and is perpendicular to the straight line connecting the center-of-gravity position of the in-wheel motor unit and the first axis in the axially perpendicular plane. Therefore, a large load due to the reaction force of the drive torque and the vibration of the center-of-gravity position is properly received by the stopper, so that a decrease in durability of the bearing portion etc. of the output shaft on the first axis is properly prevented.

In the vehicle in-wheel motor drive device recited in the third aspect of the invention, the center-of-gravity position of the in-wheel motor unit is located within a range of ±20° from the substantially horizontal direction about the first axis in the axially perpendicular plane, and a large load is generated around the first axis by displacement of the center-of-gravity position in the vertical direction due to the vertical vibration of the wheel; however, the stopper is disposed such that at least one of the positions right below and right above the center-of-gravity position is included within the contact range of the stopper. Therefore, the large load due to the reaction force of the drive torque and the vibration of the center-of gravity position is properly received by the stopper, so that a decrease in durability of the hearing portion etc. of the output shaft on the first axis is properly prevented.

In the vehicle in-wheel motor drive device recited in the fourth aspect of the invention, the coupling position is defined at one position, and the second axis and the coupling position are located within a range of ±20° the horizontal direction about the first axis, and the second axis is closer to the first axis than the coupling position the axially perpendicular plane. The center-of-gravity position of the in-wheel motor unit is highly likely to fall within the range of ±20° in the horizontal direction from the first axis, and a large load is generated around the first axis by displacement of the center-of-gravity position in the vertical direction due to the vertical vibration of the wheel; however, since the stopper is provided, a decrease in durability of the bearing portion etc. is prevented. Additionally, the second axis is closer to the first axis than the coupling position in the axially perpendicular plane, and the distance from the coupling position provided with the elastic member to the first axis is longer than the distance from the center-of-gravity position to the first axis, and therefore, the load applied to the elastic member is reduced in accordance with the lever ratio thereof. Therefore, the elastic member to be employed can have a low elastic modulus and a high flexibility, so that the minute vibrations can properly be absorbed to improve the NV performance, and a decrease in the required strength of the elastic member enables miniaturization and weight reduction thereof, so that the mountability in a narrow wheel is improved.

In the vehicle in-wheel motor drive device recited in the fifth aspect of the invention, the stopper is disposed such that at least one of the positions right below and right above the center-of-gravity position of the in-wheel motor unit is included within the contact range of the stopper in the axial direction of the first axis. Therefore, the large load due to the reaction force of the drive torque and the vibration of the center-of-gravity position is properly received by the stopper, so that a decrease in durability of the bearing portion etc. of the output shaft on the first axis is properly prevented.

In the vehicle in-wheel motor drive device recited in the sixth aspect of the invention, the stopper is disposed to regulate a displacement in a pivoting direction due to the reaction force of the drive torque during forward running out of vibrations having the component in the vertical direction around the first axis of the in-wheel motor unit. Therefore, the large load due to the reaction force of the drive torque and the vibration of the center-of-gravity position is properly received by the stopper during forward running, which is performed highly frequently.

BRIEF DESCRIPTION OF DRAWNGS

DESCRIPTION OF THE PREFERRED EMBODIMENTS

The present invention is applied to an in-wheel motor drive device rotationally driving each wheel by an electric motor in a vehicle such as an electric vehicle and a hybrid vehicle. This in-wheel motor drive device may be steered by a steering device or may not be steered. As a transmission changing a speed of the rotation of the electric motor and transmitting to an output shaft, a speed reducer reducing and transmitting the speed of the rotation of the electric motor is suitable; however, a speed increaser may be provided. Although this transmission is made up of, for example, a pair of external gears disposed on a first axis and a second axis and meshed with each other, various kinds of transmissions are employable such as a transmission with three or more axes and a transmission using an internal gear in combination with the external gears.

A supporting member supporting an in-wheel motor unit is integrally fixed to a knuckle etc. attached to a vehicle body via a suspension device such as a suspension arm and a shock absorber, for example, or is formed integrally with the knuckle etc. A coupling position for preventing the rotation of the in-wheel motor unit via an elastic member may be defined at one position, or multiple coupling positions can be set. If the multiple coupling positions are set, the positions are desirably set on one circumference around the first axis. Although a cylindrical rubber bush is suitably used as the elastic member, another elastic body capable of elastically preventing the rotation of the in-wheel motor unit is also employable.

The in-wheel motor unit is disposed on the supporting member in a posture in which a direction from the first axis to the center-of-gravity position has a horizontal direction component in an axially perpendicular plane perpendicular to the first axis. When a direction to the center-of-gravity position from the first axis is closer to the horizontal direction, the influence of the vertical vibration of the wheel is greater, and therefore, when the center of gravity is located within a range of ±20° from the horizontal direction around the first axis, furthermore, within a range of ±10°, the effect of providing a stopper is large; however, if a direction to the center of gravity position from the first axis has the horizontal direction component, the effect of providing the stopper can be obtained even outside the range of +20°. The stopper which regulates the vibration having the vertical direction component in the in-wheel motor unit may be disposed on the lowerside or the upper side of the in-wheel motor unit or can be disposed on both sides.

The stopper is preferably disposed such that a perpendicular line L2 is included within a contact range of the stopper to regulate a displacement in a direction of the perpendicular line L2 passing through the center-of-gravity position with respect to a straight line L1 connecting the center-of-gravity position of the in-wheel motor unit and the first axis in the axially perpendicular plane, the stopper can be disposed such that a position shifted from the perpendicular line L2 toward the first axis or toward the opposite side to the first axis is defined as the contact position of the stopper. A coupling position coupled by the elastic member is preferably defined such that the second axis is closer to the first axis than the coupling position with regard to the straight line L1 direction, for example; however, the position may be defined on the first axis side relative to the second axis. If the center-of-gravity position of the in-wheel motor is within the range of ±20° in the horizontal direction from the first axis in the axially perpendicular plane, the stopper may be disposed such that at least one of positions right below and right above the center-of-gravity position is included in the contact position of the stopper in the axially perpendicular plane. If the coupling position is defined on the side opposite to the first axis across the center-of-gravity position in the horizontal direction, the stopper can be disposed such that the stopper comes into contact on the first axis side, or the coupling position side, relative to a position right below or right above the center-of-gravity position.

The stopper is desirably disposed such that at least one of positions right below and right above the center-of-gravity position of the in-wheel motor unit is included in the contact position of the stopper also with respect to the axial direction of the first axis; however, the stopper can be disposed such that the contact position of the stopper is defined as a position deviated from the position right below or right above the center-of-gravity position in the axial direction. Although the stopper is disposed to regulate, for example, a displacement in a pivoting direction due to a reaction force of a drive torque during forward running out of vibrations having a component in the vertical direction around the first axis of the in-wheel motor unit, the stopper can be disposed to regulate a displacement in the direction opposite to the pivoting direction.

EXAMPLE

Examples of the present invention will now be described in detail with reference to the drawings. In the following examples, the figures are simplified or deformed as appropriate for description, and portions are not necessarily precisely drawn in terms of dimension ratio, shape, etc.

Figure 1:
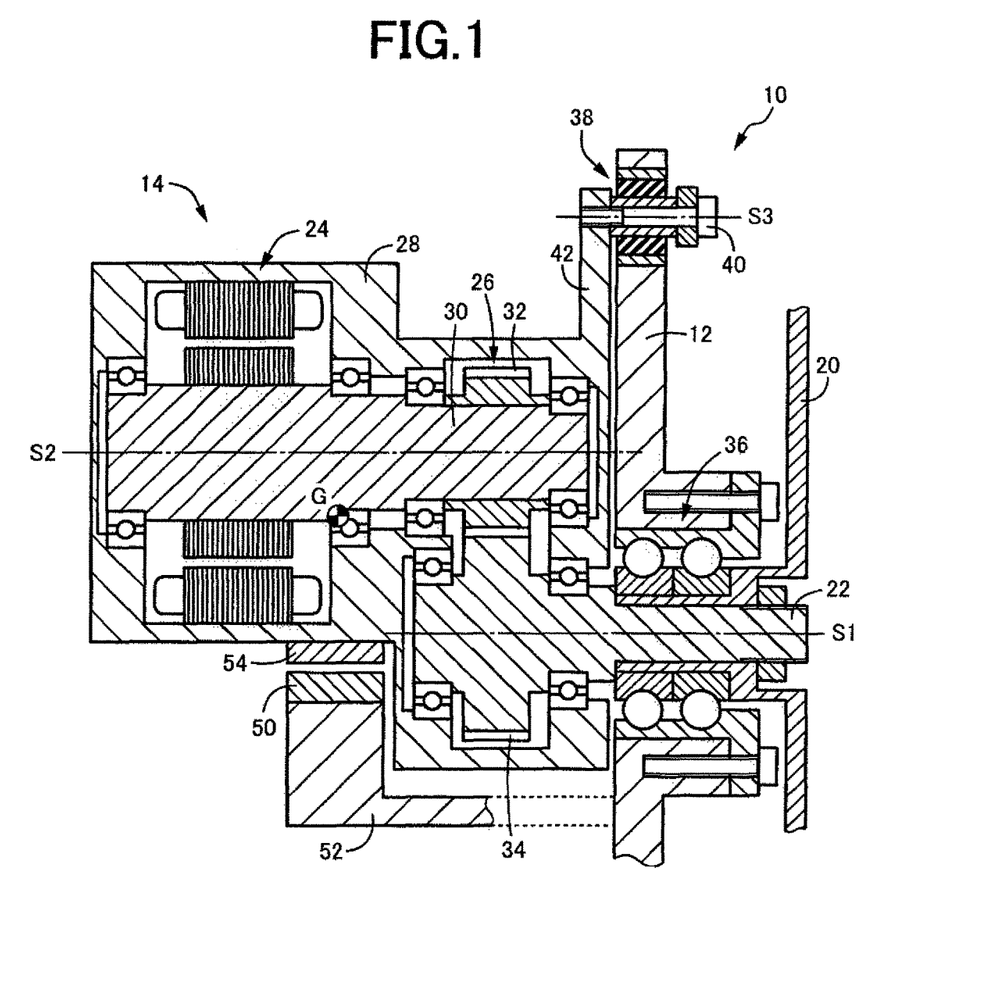
FIG. 1 is a cross-sectional view of a structure of a vehicle in-wheel motor drive device that is an example of the present invention, corresponding to a cross section taken along I-I indicated by arrows in FIG. 2.
Figure 2:
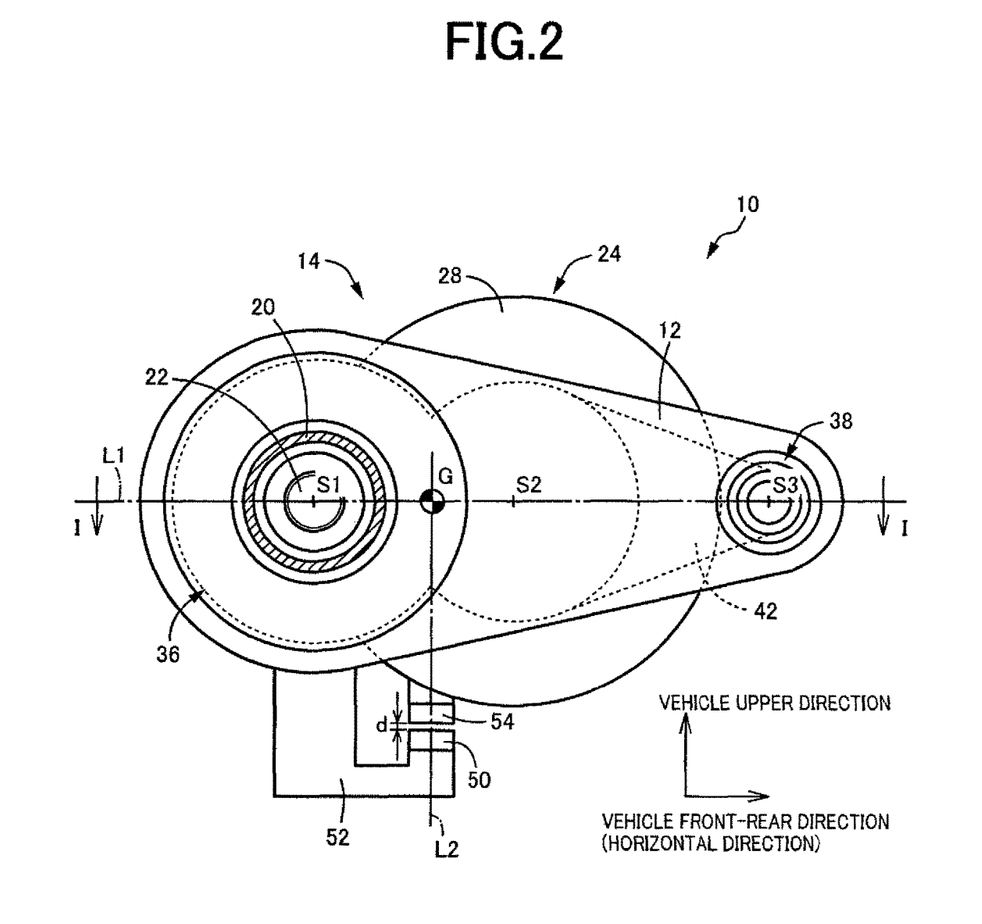
FIG. 2 is a front view of the vehicle in-wheel motor drive device with a wheel hub portion cut away, as seen from the right side of FIG. 1.

FIG. 1 is a cross-sectional view of a structure of a vehicle in-wheel motor drive device 10 that is an example of the present invention, corresponding to a cross section taken along I-I indicated by arrows in FIG. 2. FIG. 2 is a front view of the vehicle in-wheel motor drive device 10 with a wheel huh portion 20 cut away, as seen from the right side of FIG. 1. The vehicle in-wheel motor drive device 10 is used for an electric vehicle, for example, and has a supporting member 12 integrally fixed to a knuckle etc. attached to a vehicle body via a suspension device not shown or formed integrally with the knuckle etc., and an in-wheel motor unit 14 disposed on and supported by the supporting member 12. The in-wheel motor unit 14 includes an output shaft 22 disposed on a substantially horizontal first axis S1 that is the rotation center of the wheel hub portion 20, an electric motor 24 disposed on a second axis S2 parallel to the first axis S1 and offset from the first axis S1, and a speed reducer 26 reducing and transmitting a speed of the rotation of the electric motor 24 to the output shaft 22, and the output shaft 22, the electric motor 24, and the speed reducer 26 are housed and held in a holding case 28.

The output shaft 22 and a motor shaft 30 of the electric motor 24 are each supported by the holding case 28 rotatably around an axis (a first axis S1, a second axis S2) via multiple bearings. The speed reducer 26 corresponds to a transmission and is made up of a pair of a small-diameter gear 32 and a large-diameter gear 34 having external teeth and meshed with each other. The small-diameter gear 32 is integrally disposed on the motor shaft 30, while the large-diameter gear 34 is integrally disposed on the output shaft 22, and the rotation of the electric motor 24 is decelerated according to a gear ratio between the gears 32 and 34 and transmitted to the output shaft 22.

The wheel hub portion 20 corresponds to a wheel, and a wheel having a tire attached thereto is integrally attached by a bolt etc. The wheel hub portion 20 is coupled relatively non-rotatably to a small diameter portion of the output shaft 22 projecting from the holding case 28 by press fitting, spline fitting, etc., and is supported by the supporting member 12 rotatably around the first axis S1 together with the output shaft 22 via a hub bearing 36. The output shall 22 is supported by the supporting member 12 rotatably around the first axis S1 so that the entire in-wheel motor unit 14 is supported by the supporting member 12 rotatably around the first axis S1.

The in-wheel motor unit 14 is also coupled to the supporting member 12 via an elastic member 38 which deforms elastically on a third axis S3 that is a coupling position defined apart from the first axis S1. The elastic member 38 is a cylindrical rubber bush disposed between an inner cylinder and an outer cylinder, and the inner cylinder is integrally fixed to the holding case 28 via an attachment pin 40, while the outer cylinder is integrally fixed into an attachment hole formed in the supporting member 12 by press fitting etc., so that the in-wheel motor unit 14 is elastically prevented from rotating around the first axis S1. The holding case 28 is provided with a coupling projecting portion 42 extending parallel to the supporting member 12 toward the third axis 53, and the attachment pin 40 is screwed into the coupling projecting portion 42. The holding case 28 may be made up of multiple members as necessary, and the coupling projecting portion 42 may separately be formed and integrally be fixed to the holding case 28.

The coupling position is defined at one position on a straight line L1 connecting the first axis S1 and a center-of-gravity position G of the in-wheel motor unit 14 in an axially perpendicular plane perpendicular to the first axis S1, i.e., in the front view shown in FIG. 2. In this example, the second axis S2 is also on the straight line L1, the center-of-gravity position G is at an intermediate position between the first axis S1 and the second axis S2, and the third axis S3 (i.e., the coupling position) is defined at a position more distant than the second axis S2 from the first axis S1 and on the outside of the electric motor 24. The straight line L1 is substantially horizontal, i.e., within a range of inclination of about ±5° relative to the horizontal direction, and the in-wheel motor unit 14 is supported by the supporting member 12 via the hub bearing 36 and the elastic member 38 in a posture in which a direction to each of the second axis 52 and the center-of-gravity position G from the first axis S1 has a horizontal direction component (in the example, it is a substantially horizontal direction).

On the other hand, the supporting member 12 is provided with a stopper 50 brought into contact with the in-wheel motor unit 14 to regulate vibrations having a component in the vertical direction around the first axis S1 of the in-wheel motor unit 14 before an amount of the deformation of the elastic member 38 reaches an elastic limit. The stopper 50 is integrally disposed on the supporting member 12 via a bracket 52, while a contact portion 54 facing the stopper 50 is integrally fixed to the holding case 28 of the in-wheel motor unit 14, and the contact portion 54 is brought into contact with the stopper 50 in a substantially surface contact state. A gap dimension d between the stopper 50 and the contact portion 54 is determined such that the contact portion 54 is brought into contact with the stopper 50 immediately before the amount of the deformation of the elastic member 38 reaches the elastic limit, The stopper 50 is disposed such that a perpendicular line L2 passing through the center-of-gravity position G is included within a contact range of the stopper 50 to regulate a displacement in the perpendicular line L2 direction with respect to the straight line L1 in the axially perpendicular plane of FIG. 2. In this example, since the straight line L1 is substantially horizontal, the perpendicular line L2 is in a substantially vertical direction, and the stopper 50 is disposed such that a position right below the center-of-gravity position G is included within the contact range of the stopper 50. Further, the stopper 50 is disposed such that a position right below the center-of-gravity position G is included within the contact range of the stopper 50 with respect to the axial direction of the first axis S1, i.e., the left-right direction of FIG. 1. In FIG. 1, the stopper 50 is shown in a side surface portion (on the lower side in FIG. 1) so as to indicate the disposition position of the stopper 50 in the axial direction; however, as shown in FIG. 2, the stopper 50 is actually disposed at a position right below the center-of-gravity position G, i.e., on the back surface side of the center-of-gravity position G of FIG. 1.

In such a vehicle in-wheel motor drive device 10, since the direction from the first axis S1 to the center-of-gravity position G of the in-wheel motor unit 14 has the horizontal direction component in the axially perpendicular plane shown in FIG. 2, the center-of-gravity position G of the in-wheel motor unit 14 is vertically vibrated due to vertical vibration of the wheel, and the in-wheel motor unit 14 is swung and displaced around the first axis S1 while the elastic member 38 elastically deforms. In this case, since the stopper 50 regulates the vibration having the component in the vertical direction of the in-wheel motor unit 14 before the elastic member 38 reaches the elastic limit, the large load due to a reaction force of a drive torque and the vibration of the center-of-gravity position G is prevented from being applied to the hub bearing 36 supporting the in-wheel motor unit 14 and a peripheral portion thereof, so that a decrease in durability of the hub bearing 36 etc. can be prevented.

Since the elastic deformation of the elastic member 38 at the coupling position is allowed until the in-wheel motor unit 14 abuts on the stopper 50, minute vibrations of the in-wheel motor unit 14 due to motor torque variations, meshing vibrations of the gears 32, 34 are absorbed by the elastic member 38, so that the NV performance in the vehicle interior can properly be ensured. Particularly, since the stopper 50 prevents excessive elastic deformation of the elastic member 38, the elastic member 38 which has a low elasticity, i.e., a high softness can be employed, so that the minute vibrations can properly be absorbed.

Since the stopper 50 is disposed such that the perpendicular line L2 passing through the center-of-gravity position G is included within the contact range of the stopper 50 to regulate the displacement in the perpendicular line L2 direction with respect to the straight line L1 connecting the center-of-gravity position G of the in-wheel motor unit 14 and the first axis S1 in the axially perpendicular plane shown in FIG. 2, a large load due to the reaction force of the drive torque and the vibration of the center-of-gravity position G is properly received by the stopper 50, so that a decrease in durability of the hub bearing 36 etc. is properly prevented.

Since the center-of-gravity position G of the in-wheel motor unit 14 is located at a position apart from the first axis S1 in the substantially horizontal direction in the axially perpendicular plane shown in FIG. 2, a large load is generated around the first axis S1 by displacement of the center-of-gravity position G in the vertical direction due to the vertical vibration of the wheel; however, the stopper 50 is disposed such that the position right below the center-of-gravity position G is included within the contact range of the stopper 50, and therefore, the large load due to the reaction force of the drive torque and the vibration of the center-of-gravity position G is properly received by the stopper 50, so that a decrease in durability of the hub bearing 36 etc. is properly prevented.

Since the first axis S1, the second axis S2, and the third axis S3 are on the substantially horizontal straight line L1 in the axially perpendicular plane shown in FIG. 2, and the third axis S3 is the coupling position and is defined at a position more distant than the second axis S2 from the first axis S1, a large load is generated around the first axis S1 due to displacement of the center-of-gravity position G in the vertical direction due to the vertical vibration of the wheel; however, the distance from the third axis S3 on which the elastic member 38 is disposed, to the first axis S1 is longer than the distance from the center-of-gravity position G to the first axis S1, the load applied to the elastic member 38 is reduced in accordance with the lever ratio thereof. Therefore, the elastic member 38 to be employed can have a low elastic modulus and a high flexibility, so that the minute vibrations can properly be absorbed to improve the NV performance, and a decrease in the required strength of the elastic member 38 enables miniaturization and weight reduction thereof, which increases the degree of freedom of arrangement of the elastic member 38, so that the mountability in a narrow wheel is improved.

Since the stopper 50 is disposed such that the position right below the center-of-gravity position G of the in-wheel motor unit 14 is included within the contact range of the stopper 50 in the axial direction of the first axis S1, and the stopper 50 is disposed at the position right below the center-of-gravity position G also in the axially perpendicular plane, the large load due to the reaction force of the drive torque and the vibration of the center-of-gravity position G is properly received by the stopper 50, so that a decrease in durability of the hub bearing 36 etc. is properly prevented.

If the in-wheel motor unit 14 is subjected to rotation in the clockwise direction in FIG. 2 due to the reaction force of the drive torque during forward running while vibrations having the component in the vertical direction around the first axis S1 of the in-wheel motor unit 14 are generated, the stopper 50 is disposed at a position blow the center-of-gravity position G so as to regulate excessive displacement in the clockwise direction, and the large load due to the reaction force of the drive torque and the vibration of the center-of-gravity position G is thereby properly received by the stopper 50 during forward running, which is performed highly frequently.

Other examples of the present invention ill be described. In the following examples, portions substantially common to the examples are denoted by the same reference numerals and will not be described in detail.

Figure 3:
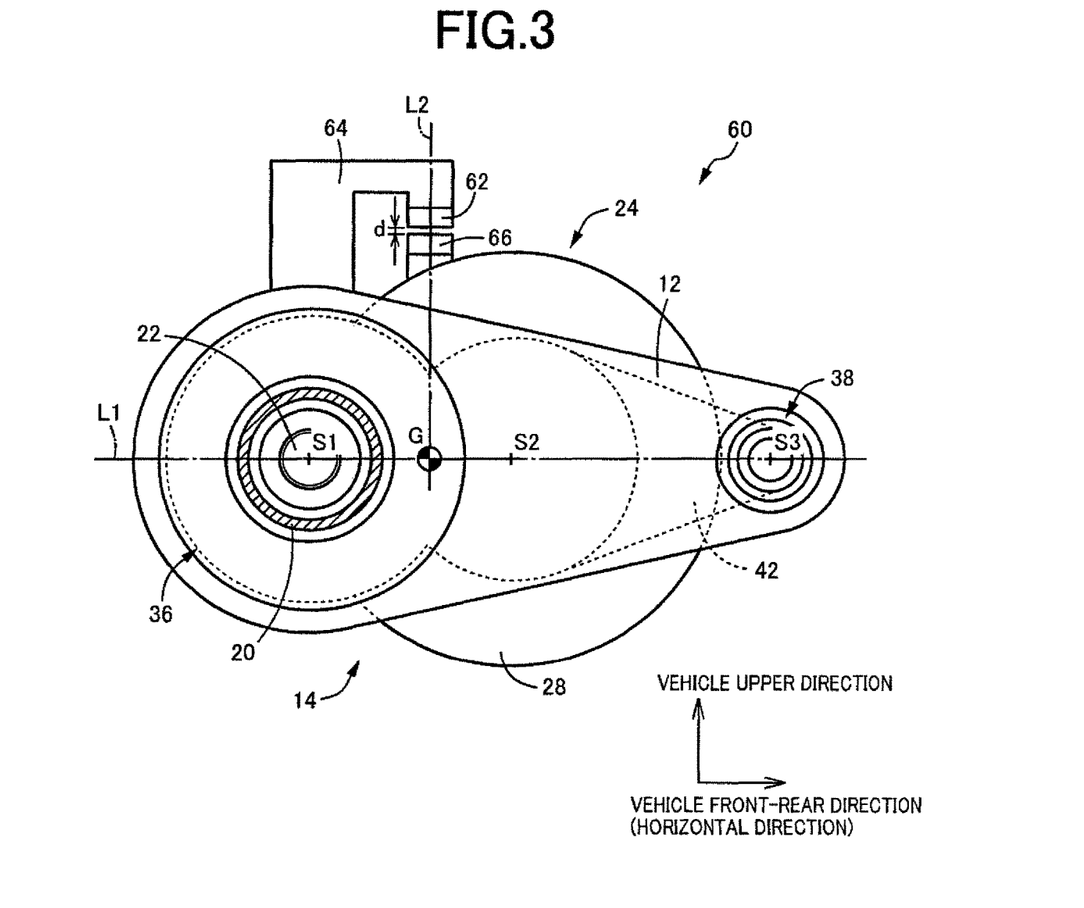
FIG. 3 is a front view for explaining another example of the present invention, corresponding to FIG. 2.

FIG. 3 is a front view of a vehicle in-wheel motor drive device 60, corresponding to an axially perpendicular plane perpendicular to the first axis S1 as in FIG. 2, and in this case, a stopper 62 is disposed at a position right above the center-of-gravity position G such that the perpendicular line L2 is included within a contact range of the stopper 62 in the axially perpendicular plane. The stopper 62 is integrally disposed on the supporting member 12 via a bracket 64, while a contact portion 66 facing the stopper 62 is integrally fixed to the holding ease 28 of the in-wheel motor unit 14, and the contact portion 66 is brought into contact with the stopper 62 in a substantially surface contact state. Even in this case, vibrations having the component in the vertical direction of the in-wheel motor unit 14 are regulated by the stopper 62, so that the same effects as the above-described example can be obtained. If the in-wheel motor unit 14 is subjected to rotation in the counterclockwise direction in FIG. 3 due to the reaction force of the drive torque during forward running while vibrations having the component in the vertical direction around the first axis S1 of the in-wheel motor unit 14 are generated, the stopper 62 is disposed at a position above the center-of-gravity position G so as to regulate excessive displacement in the counterclockwise direction, and the large load due to the reaction force of the drive torque and the vibration of the center-of-gravity position G is thereby properly received by the stopper 62 during forward running, which is performed highly frequently.

Figure 4:
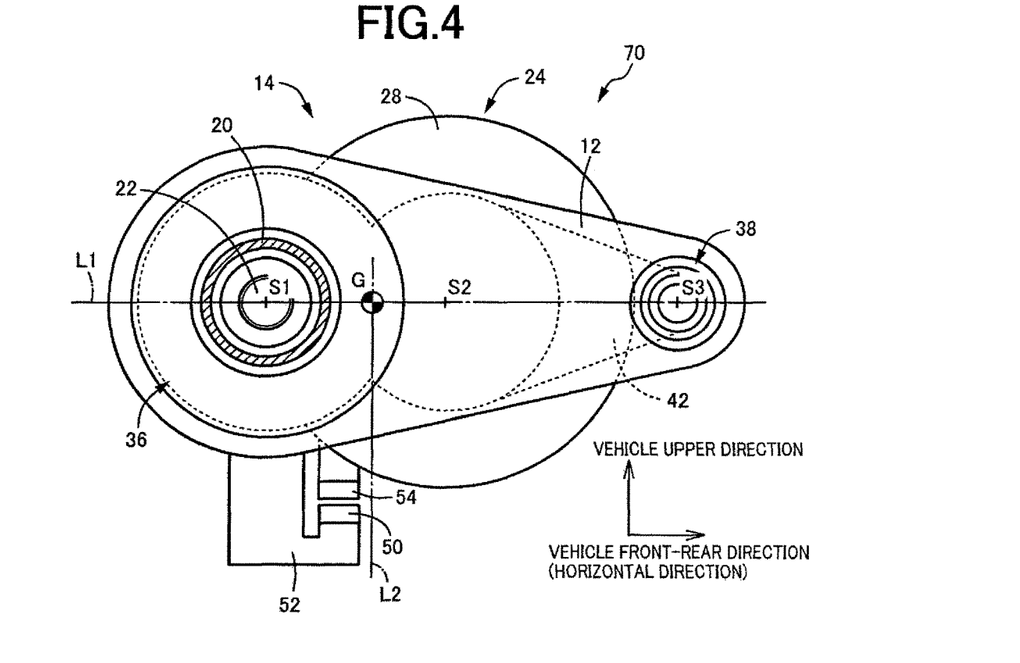
FIG. 4 is a front view for explaining still another example of the present invention, corresponding to FIG. 2.

FIG. 4 is a front view of a vehicle in-wheel motor drive device 70, corresponding to an axially perpendicular plane perpendicular to the first axis S1 as in FIG. 2, and the stopper 50 is disposed to be brought into contact with the in-wheel motor unit 14 between the center-of-gravity position G and the first axis S1 in the horizontal direction in the axially perpendicular plane. Even in this case, a large load is generated around the first axis S1 by displacement of the center-of-gravity position G in the vertical direction due to the vertical vibration of the wheel; however, the load is received by the stopper 50 and the elastic member 38 located on both sides of the center-of-gravity position G in the horizontal direction in the axially perpendicular plane, so that a decrease in durability of the hub bearing 36 etc. is prevented. Although the load is possibly applied oppositely (upward) to the hub bearing 36 with the stopper 50 acting as a fulcrum, the load is received by the elastic member 38 also at the coupling position (the third axis S3), and therefore, the load on the hub bearing 36 can be reduced as compared to when the stopper 50 is not provided.

Figure 5:
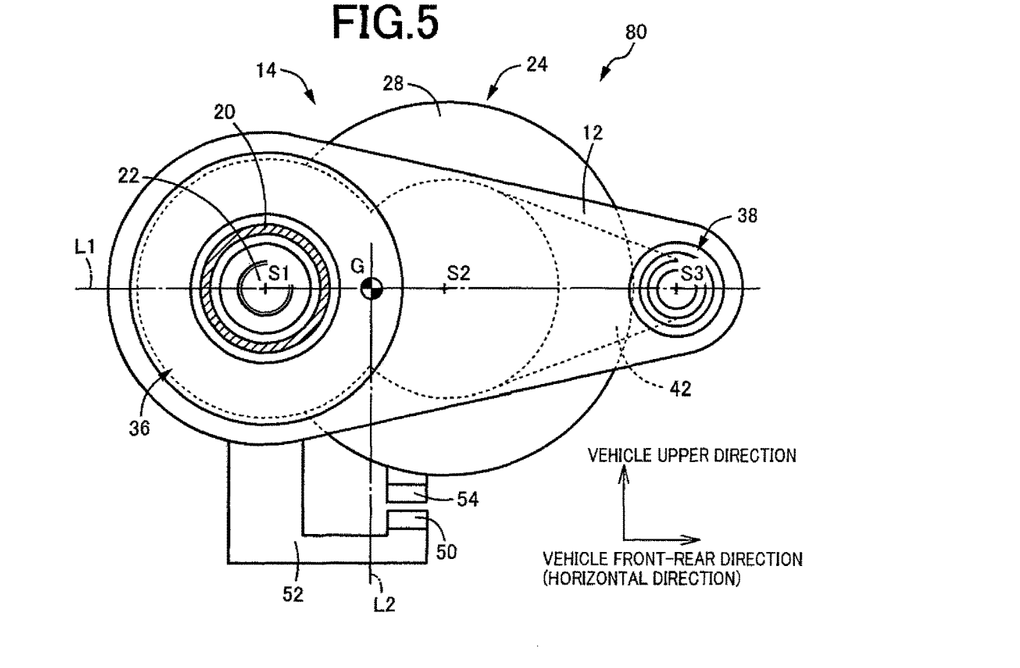
FIG. 5 is a front view for explaining still another example of the present invention, corresponding to FIG. 2.

FIG. 5 is a front view of a vehicle in-wheel motor drive device 80, corresponding to an axially perpendicular plane perpendicular to the first axis S1 as in FIG. 2, and the stopper 50 is disposed to be brought into contact with the in-wheel motor unit 14 between the center-of-gravity position G and the third axis S3 that is the coupling position in the horizontal direction in the axially perpendicular plane. Even in this case, a large load is generated around the first axis S1 by displacement of the center-of-gravity position G in the vertical direction due to the vertical vibration of the wheel; however, the load is received by the stopper 50 and the hub bearing 36 located on both sides of the center-of-gravity position G in the horizontal direction in the axially perpendicular plane, so that a decrease in durability of the hub bearing 36 etc. is prevented. In other words, since the horizontal distance (moment length) from the center-of-gravity position G to the stopper 50 is shorter than the horizontal distance from the center-of-gravity position G to the coupling position (the third axis S3), the moment around the stopper 50 as the fulcrum is reduced, and a reduction of the load on the hub bearing 36 leads to an improvement in the durability.

Figure 6:
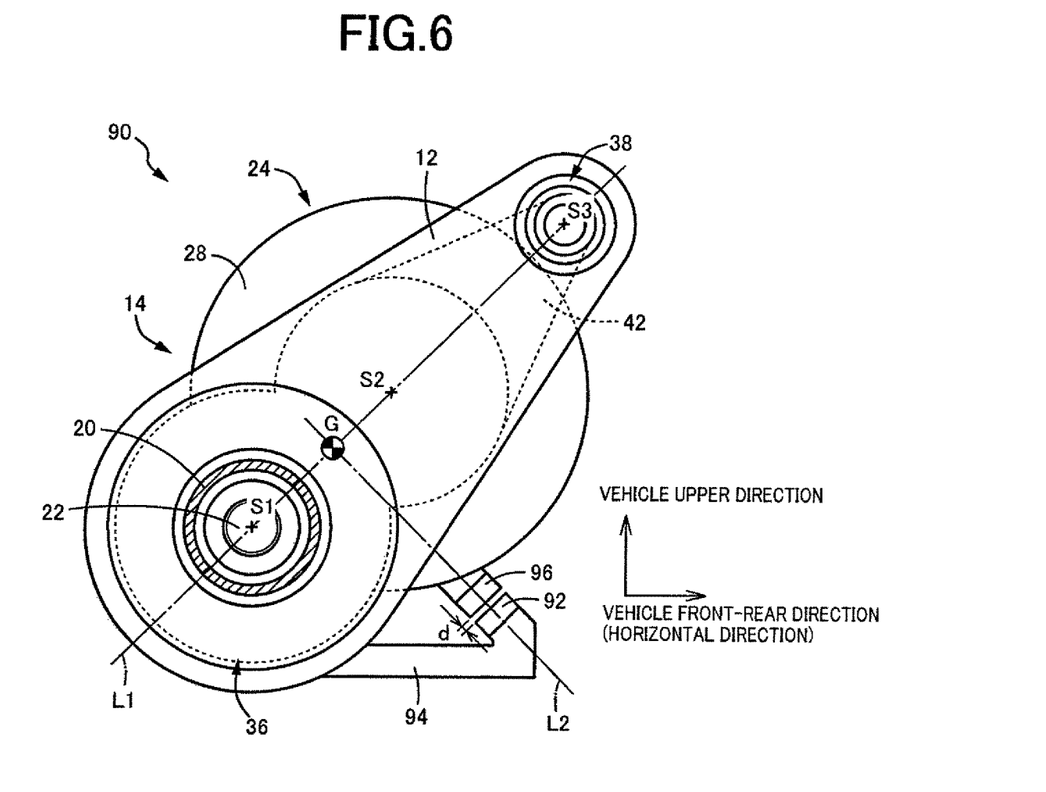
FIG. 6 is a front view for explaining still another example of the present invention, corresponding to FIG. 2.

FIG. 6 is a front view of a vehicle in-wheel motor drive device 90, corresponding to an axially perpendicular plane perpendicular to the first axis S1 as in FIG. 2, and shows a case where the straight line L1 on which the first to third axes S1-S3 and the center-of-gravity position G are located is inclined relatively significantly from the horizontal direction in the axially perpendicular plane, i.e., inclined upward at approximately 45° in FIG. 6. A stopper 92 is disposed obliquely below the center-of-gravity position G such that the perpendicular line L2 passing through the center-of-gravity position G is included within the contact range of the stopper 92 to regulate the displacement in the perpendicular line L2 direction. The stopper 92 is integrally disposed on the supporting member 12 via a bracket 94, while a contact portion 96 facing the stopper 92 is integrally fixed to the holding case 28 of the in-wheel motor unit 14, and the contact portion 96 is brought into contact with the stopper 92 in a substantially surface contact state. Even in this case, the vibration having the component in the vertical direction of the in-wheel motor unit 14 is regulated by the stopper 92, so that the same effects as the above-described example can be obtained.

Figure 7:
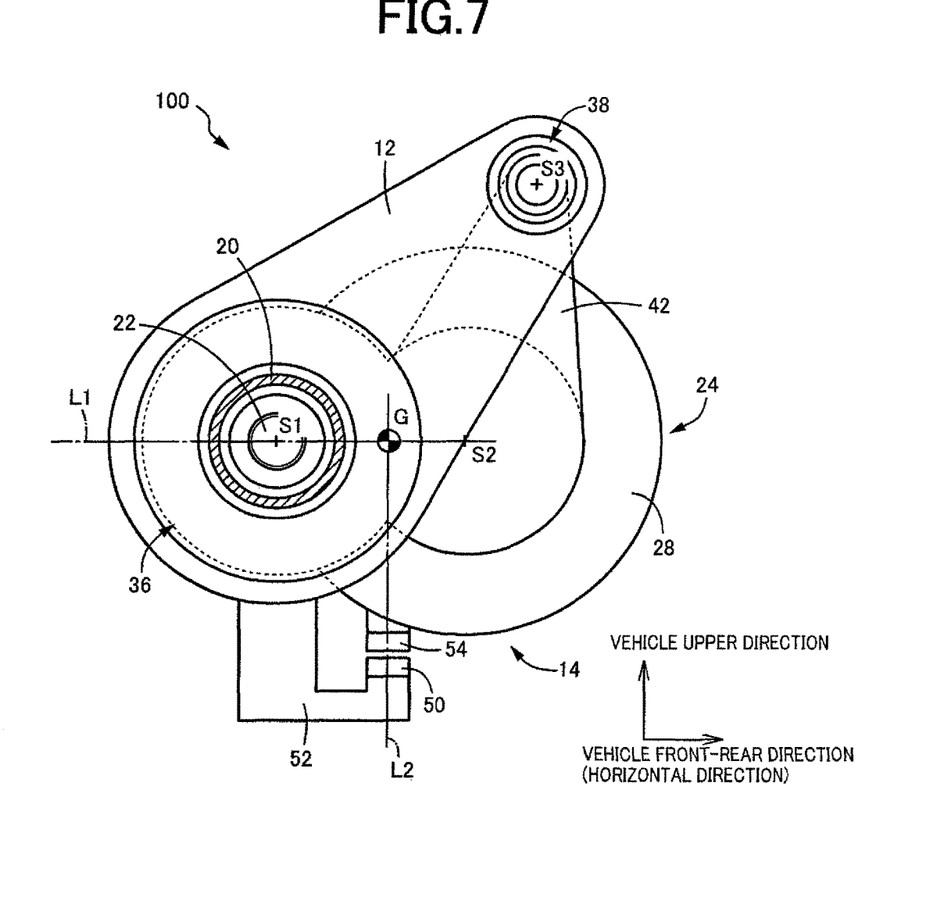
FIG. 7 is a front view for explaining still another example of the present invention, corresponding to FIG. 2.

FIG. 7 is a front view of a vehicle in-wheel motor drive device 100, corresponding to an axially perpendicular plane perpendicular to the first axis S1 as in FIG. 2, and shows a case where the third axis S3 serving as the coupling position is defined at a position separated upward from the straight line L1 as compared to the in-Wheel motor drive device 10 of the above-described example. Even in this case, the vibration having the component in the vertical direction of the in-wheel motor unit 14 is regulated by the stopper 50, so that the same effects as the above-described example can be obtained. Multiple coupling positions may be set on one circumference around the first axis S1 to couple the in-wheel motor unit 14 to the supporting member 12 by using the multiple elastic members 38.

Although the stopper 50, 92 is disposed below the center-of-gravity position G in the examples of FIGS. 4 to 7, the examples are also applicable in the same way to the case that the stopper is disposed above the center-of-gravity position G as in the example of FIG. 3.

Although the examples of the present invention have been described in detail with reference to the drawings, these are merely an embodiment, and the present invention can be implemented in variously modified and improved forms based on the knowledge of those skilled in the art.

REFERENCE SIGNS LIST 10, 60, 70, 80, 90, 100: Vehicle in-wheel motor drive device 12: Supporting member 14: In-wheel motor unit 20: Wheel hub portion (Wheel) 22: Output shaft 24: Electric motor 26: Speed reducer (Transmission) 28: Holding case 38: Elastic member 50, 62, 92: Stopper S1: First axis S2: Second axis S3: Third axis (Coupling position) L1: Straight line L2: Perpendicular line G: Center-of-gravity position

What is claimed is:

1. A vehicle in-wheel motor drive device comprising:
   an in-wheel motor unit having an output shaft arranged on a substantially horizontal first axis that is a center of rotation of a wheel, an electric motor arranged on a second axis parallel to the first axis and offset from the first axis, a transmission changing a speed of rotation of the electric motor and transmitting to the output shaft, and a holding case holding the output shaft, the electric motor, and the transmission;
   a supporting member supporting the output shaft projecting from the holding case rotatably around the first axis so that the supporting member supports the in-wheel motor unit via the output shaft rotatably around the first axis; and
   an elastic member disposed between the holding case and the supporting member at a coupling position defined apart from the first axis and preventing the in-wheel motor unit from rotating around the first axis by elastic deformation, wherein
   the in-wheel motor unit is supported by the supporting member in a posture in which a direction from the first axis to a center-of-gravity position of the in-wheel motor unit has a horizontal direction component in an axially perpendicular plane perpendicular to the first axis, and wherein
   the supporting member is provided with a stopper brought into contact with the in-wheel motor unit to regulate vibrations having a component in a vertical direction around the first axis of the in-wheel motor unit before the elastic member reaches an elastic limit.

2. The vehicle in-wheel motor drive device according to claim I, wherein
   the stopper is disposed such that a perpendicular line is included within a contact range of the stopper to regulate a displacement in a direction of the perpendicular line, wherein the perpendicular line passes through the center-of-gravity position and is perpendicular to a straight line connecting the center-of-gravity position of the in-wheel motor unit and the first axis in the axially perpendicular plane.

3. The vehicle in-wheel motor drive device according to claim 1, wherein
   the center-of-gravity position of the in-wheel motor unit is located within a range of ±20° from the horizontal direction about the first axis in the axially perpendicular plane, and wherein
   the stopper is disposed such that at least one of positions right below and right above the center-of-gravity position is included in a contact range of the stopper in the axially perpendicular plane.

4. The vehicle in-wheel motor drive device according to claim 1, wherein
   the coupling position is defined at one position., and wherein
   the second axis and the coupling position are located within a range of ±20° from the horizontal direction about the first axis, and the second axis is closer to the first axis than the coupling position in the axially perpendicular plane.

5. The vehicle in-wheel motor drive device according to claim 1, wherein
   the stopper is disposed such that at least one of positions right below and right above the center-of-gravity position of the in-wheel motor unit is included in the contact range of the stopper in the axial direction of the first axis.

6. The vehicle in-wheel motor drive device according to claim 1, wherein the stopper is disposed to regulate a displacement in a pivoting direction due to a reaction force of a drive torque during forward running out of vibrations having a component in the vertical direction around the first axis of the in-wheel motor unit.

* * * * *